(12) United States Patent
Allman et al.

(10) Patent No.: US 7,287,542 B2
(45) Date of Patent: Oct. 30, 2007

(54) SHUTOFF VALVE FOR MECHANICALLY SEALED ORVR SYSTEM

(75) Inventors: Craig Harold Allman, Ypsilanti, MI (US); Daniel Lee Pifer, Chelsea, MI (US); Russell Carl Jahnke, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 291 days.

(21) Appl. No.: 11/102,342

(22) Filed: Apr. 8, 2005

(65) Prior Publication Data

US 2006/0235989 A1 Oct. 19, 2006

(51) Int. Cl.
*F16K 17/36* (2006.01)
*F16K 17/04* (2006.01)

(52) U.S. Cl. ............... 137/14; 123/519; 137/39; 137/43; 137/587; 141/59

(58) Field of Classification Search ............ 137/14, 137/41, 39, 42, 43, 587, 588; 123/519; 141/59
See application file for complete search history.

(56) References Cited

U.S. PATENT DOCUMENTS

| 4,790,349 A | * | 12/1988 | Harris | .................. | 137/587 |
|---|---|---|---|---|---|
| 5,054,508 A | * | 10/1991 | Benjey | .................. | 137/43 |
| 5,099,880 A | | 3/1992 | Szlaga et al. | | |
| 5,183,087 A | | 2/1993 | Aubel et al. | | |
| 5,318,069 A | | 6/1994 | Harris | | |
| 5,388,611 A | | 2/1995 | Harris | | |
| 5,462,100 A | | 10/1995 | Covert et al. | | |
| 5,603,349 A | | 2/1997 | Harris | | |
| 5,640,993 A | | 6/1997 | Kasugai et al. | | |
| 5,755,248 A | | 5/1998 | Szlaga et al. | | |
| 5,809,976 A | | 9/1998 | Cook et al. | | |
| 6,003,499 A | * | 12/1999 | Devall et al. | ............ | 123/520 |
| 6,058,963 A | * | 5/2000 | Enge et al. | ............ | 137/202 |
| 6,058,970 A | * | 5/2000 | Osaki et al. | ............ | 137/587 |
| 6,353,955 B2 | | 3/2002 | Araki et al. | | |
| 6,779,544 B2 | | 8/2004 | Devall | | |

* cited by examiner

*Primary Examiner*—Stephen M. Hepperle
(74) *Attorney, Agent, or Firm*—Anna M. Shih

(57) ABSTRACT

A vapor vent/tipping valve has a diaphragm with a bleed therethrough responsive to the differential pressure of bleed flow to control vapor venting to the canister and vapor recirculation to the filler tube. A dip tube causes rising fuel in the tank to close the dip tube and prevent vapor flow to the diaphragm bleed thereby starving the recirculation line and allowing nozzle discharge to create a vacuum in the filler and effect nozzle shutoff. Alternatively, float operated shutoff valves may be employed in the dip tube and vapor vent chamber inlet, the shutoff valves may include inertial members for closing the float valves to afford tipping/rollover protection.

13 Claims, 2 Drawing Sheets

SHUTOFF VALVE FOR MECHANICALLY SEALED ORVR SYSTEM

BACKGROUND

Recently mandated vapor emission requirements for motor vehicle fuel tank systems have required that the system seal about the dispensing nozzle to prevent escape of fuel vapor to the atmosphere during refueling and such systems are often referred to as On-Board Refueling Vapor Recovery (ORVR) Systems. When a seal is disposed about the refueling nozzle, it is necessary to recirculate fuel vapor to the upper end of the filler tube in the region surrounding the nozzle in order to prevent the aspiration effect of nozzle discharge from causing premature activation of the vacuum sensitive automotive shutoff mechanism provided in the dispensing nozzle.

In current production motor vehicles, the more widely used systems rely upon the rising fuel level in the tank to cover the end of the vapor recirculation tube connected to the tank to thereby shut off the flow of recirculating vapor and create a vacuum in the region of the filler tube about the dispensing nozzle and thus activate the automatic shutoff mechanism in the dispensing nozzle.

However, problems have been encountered in service where the seal about the dispensing nozzle leaks. In this event, the rising fuel in the tank closes the recirculation tube; however, the air leakage about the nozzle seal provides sufficient make-up air for the aspiration effect of the fuel discharging from the nozzle so as to prevent the formation of a vacuum and thus failure of the automatic nozzle shutoff occurs.

Thus, it has been desired to provide a simple, low cost yet effective way of insuring appropriate shutoff of a fuel dispensing nozzle in a tank filler tube and to prevent failure of the nozzle shutoff due to improper sealing about the nozzle and to prevent fuel from backing up in the filler tube and spilling to the atmosphere.

BRIEF SUMMARY

The exemplary embodiments described in the present specification, drawings and the claims address the above-described problem of insuring appropriate fuel dispensing nozzle shutoff in a fuel tank filler tube system and particularly where the seal about the nozzle is not effective and permits air to be entrained about the nozzle during refueling. This is accomplished in the present exemplary embodiments by providing a pressure differential responsive valve on the tank which shuts off the vapor venting from the valve to a storage canister and also ensures closing of the fuel vapor recirculation line to the upper end of the filler tube. In one embodiment a dip tube is provided in the inlet of the vapor recirculation line such that upon rising liquid fuel level in the tank the dip tube is closed, thereby preventing passage of fuel vapor to the recirculation line. The starving of fuel vapor flow to the recirculation line depletes the pressure differential on the pressure responsive means, permitting the valve to close, thereby shutting off vapor flow to the canister. In an alternative embodiment, a float operated shutoff valve may be employed in the vapor inlet port from the tank to the valve; and, another float operated shutoff valve may also be included in the dip tube for redundancy. If desired inertial members may be incorporated in the shutoff valves for effecting closing in the event of tipping beyond a threshold amount or vehicle rollover.

DETAILED DESCRIPTION

Figure 1:
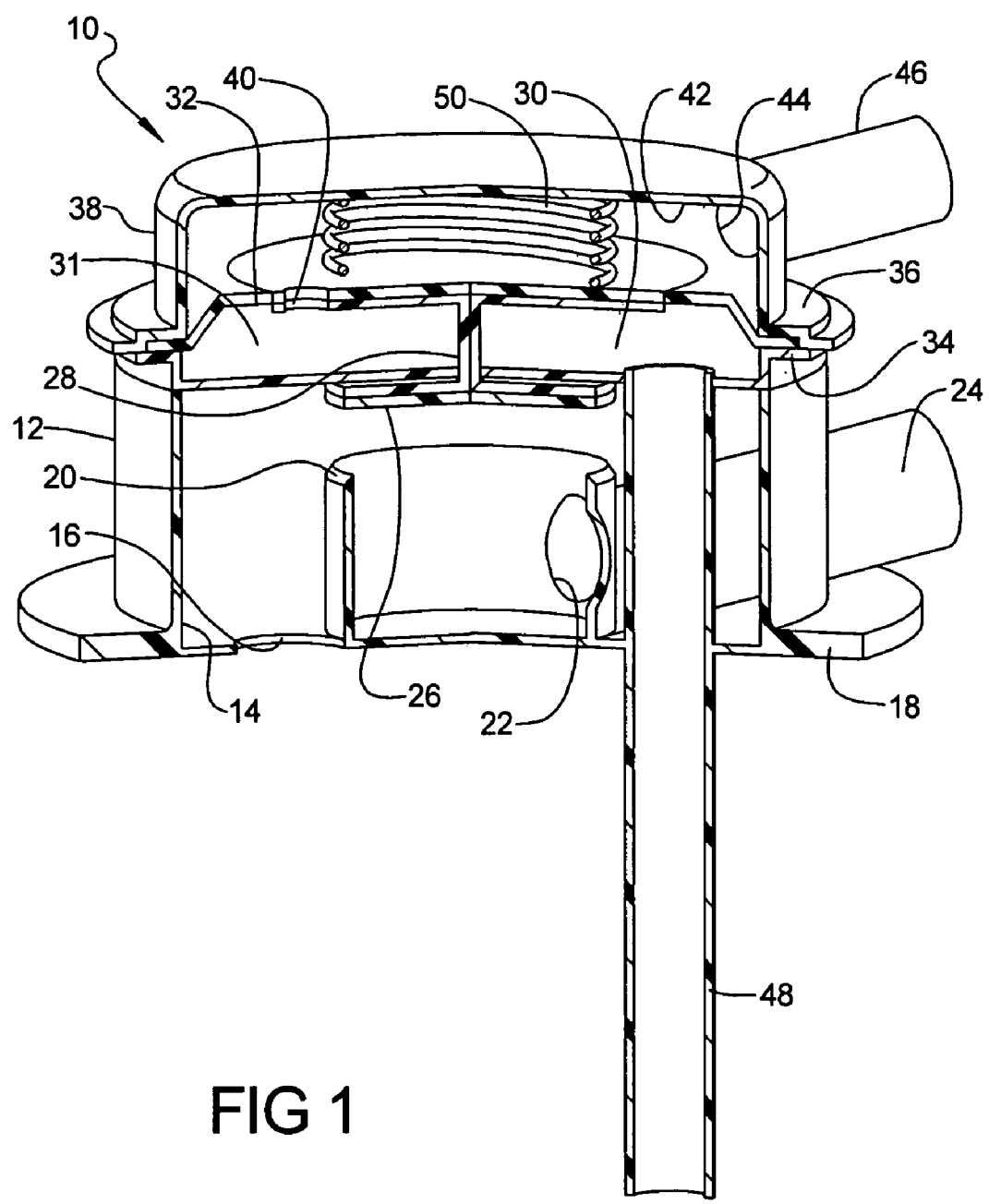
FIG. 1 is an axonometric view with portions broken away of an embodiment employing a dip tube for stopping flow to the recirculation line and a pressure responsive valve for closing the vent line to the canister; and, FIG. 2 is an alternate embodiment of the valve of FIG. 1 and shows float operated shutoff valves in the chamber inlet and the dip tube.

Referring to FIG. 1, the valve assembly for use in a fuel tank is indicated generally at 10 and includes a lower housing 12 defining a fuel vapor vent chamber 14 having a vapor inlet 16 for receiving fuel vapor from the interior of the tank. Housing 12 may have an annular mounting flange 18 formed thereon for mounting over an access opening in the tank by any suitable technique such as weldment.

The vent chamber 14 includes a valve seat 20 about the entrance to a venting passage 22 which extends outwardly of the housing through a hose connector fitting 24. Moveable valve member 26 is disposed for movement with respect to the valve seat 20; and, valve member 26 has an operating rod 28 connected thereto which extends upwardly through the upper wall 30 of the venting chamber and is connected to the underside of a pressure responsive diaphragm 32. Diaphragm 32 has its periphery sealed between a flange 34 provided on the lower housing 12 and a corresponding flange 36 provided about an upper housing 38. The housings 12 and 38 may be formed of suitable plastic material and the flanges 34, 36 permanently sealed by any suitable expedient, as for example, adhesive bonding or weldment. In the present practice, it has been found satisfactory to form the diaphragm 32 of suitable fuel vapor resistant and impermeable elastomeric material.

The diaphragm 32 has a bleed orifice 40 formed therein which is sized to permit a desired amount of recirculation flow through chamber 42 to a recirculation outlet passage 44 which extends outwardly of the housing 38 through a hose fitting 46. Alternatively a bypass channel around the diaphragm may be formed in the housings.

A dip tube 48 extends upwardly through chamber 14 and through the upper wall 30 of the chamber 14 into another chamber 31 formed beneath the diaphragm 32; and, dip tube 48 provides flow of vapor from the fuel tank through the chamber below the diaphragm and through bleed orifice 40 and passage 44 for recirculation to the upper end of the fuel filler tube (not shown).

A spring 50 has one end thereof contacting the upper surface of diaphragm 32 with the opposite end thereof registered against the inside surface of the upper housing 38; and, it will be understood that spring 50 provides a preload and a bias downwardly on diaphragm 32. In the embodiment of FIG. 1, during normal fueling vapor flow pressure through dip tube 48 creates sufficient pressure differential across bleed orifice 40 so as to cause the diaphragm to overcome the preload force of spring 50 and raise valve member 26 upwardly from the valve seat 20 to the position shown in solid outline in FIG. 1. The valve in the open position as shown in FIG. 1 thus permits fuel vapor to flow through inlet 16 and over valve seat 20 and through passage 22 for connection to a storage canister.

In the event that liquid fuel in the tank rises to a level so as to cover the lower end of the dip tube 48, fuel vapor no longer enters the chamber below the diaphragm and the pressure across the diaphragm equalizes, thereby permitting spring 50 to close valve 26 against valve seat 20 shutting off vapor flow to passage 22, the canister and to the recirculation passage 44. It will be understood that stopping recirculation flow through passage 44 allows fuel dispensing from the nozzle to create a vacuum in the region surrounding the nozzle and cause the nozzle to shut off.

Figure 2:
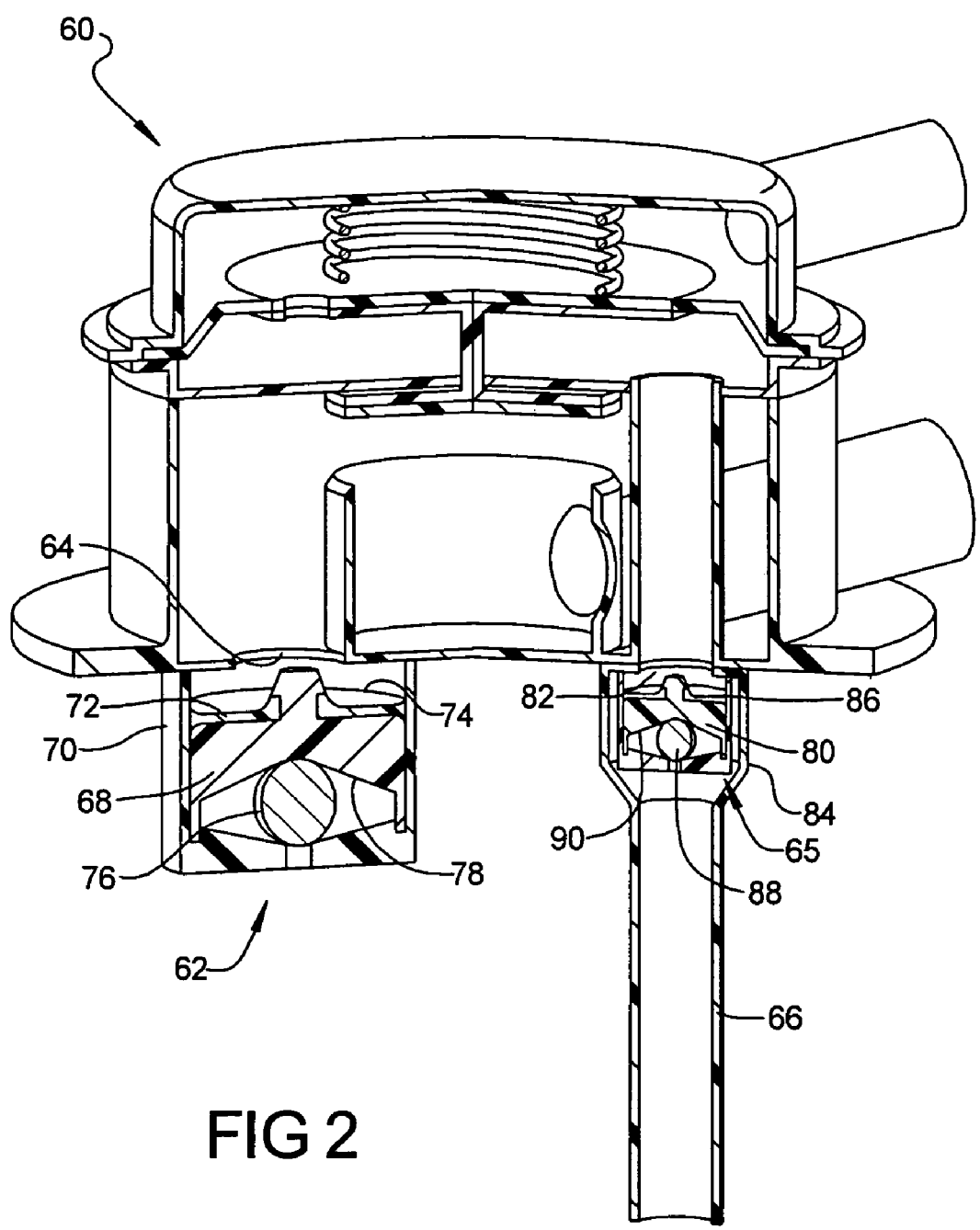

Referring to FIG. 2, an alternate embodiment of the invention is indicated generally at 60 and which is otherwise identical to the embodiment of FIG. 1 with the exception of shutoff valve indicated generally at 62 employed in the inlet 64 of the vent chamber; and, a second shutoff valve indicated generally at 65 disposed in an enlarged diameter portion 84 of the dip tube 66.

Shutoff valve 62 includes a float operator 68 which is retained in a housing 70 attached to the undersurface of the valve housing; and, float 68 is retained therein by the housing 70. Float 68 has a flexible valving member 72 formed on the upper end thereof which is operable upon the float rising, due to the rising level of liquid fuel to close the inlet 64 by the peripheral bead 74 of the valve member contacting the undersurface of the housing. In the present practice, the flexible valve member 72 is formed of elastomeric material.

Optionally an inertial member in the form of a sphere 76 is captured between the lower portion of the housing 70 and the lower surface of the float 68. Inertial member 76 is operable upon tipping of the valve 60 to a threshold angle, to act against cam surface 78 provided on the bottom of the float to move the float upwards and cause closing of valve member 72 over the inlet 64.

Valve 65 includes a float operator 80 with a flexible valve member 82 disposed on the upper end of the float. The dip tube has the enlarged diameter portion 84 sized for housing the float to permit movement therein. It will be understood that rising fuel level in the tube 66 causes float 80 to move upwardly, closing the valve member 82 about the opening in the tube formed in the enlarged portion of the tube 84 and as denoted by reference numeral 86 in FIG. 2.

Optionally an inertial member 88 may be disposed or acting against a cam surface 90 formed on the undersurface of the float in the event of tipping or rollover such that the inertial member causes the float to move upward closing the orifice 86 and preventing escape of fuel from the tank.

The present specification, drawings and claims describe a valve assembly for use in an ORVR system which provides redundancy for shutting off vapor flow to the recirculation tube to thereby insure proper shutoff of the fuel dispensing nozzle.

Modifications and variation to the exemplary embodiments described herein may be made within the scope of the following claims.

What is claimed is:

1. A combined-vapor vent/tipping and shutoff valve assembly for use in a fuel tank comprising:
    a housing defining a vent-chamber having an inlet for receiving fuel vapor from the tank and a vent outlet adapted for connection to a vapor storage device, said housing further defining a recirculation chamber having an outlet adapted for connection to a fuel tank filler tube,
    a valve member disposed in said vent chamber and moveable therein for controlling flow between said inlet and said vent outlet;
    a dip tube associated with said housing and communicating with said recirculation chamber and adapted for venting vapor until liquid fuel covers the end thereof; and,
    a diaphragm disposed in said recirculation chamber, wherein the diaphragm partitions the recirculation chamber and defines a passage across the diaphragm to form a flow restriction between said dip tube and said recirculation chamber outlet and operative for effecting movement of said valve member in response to a difference in pressure forces across said flow restriction acting on said pressure responsive means.

2. The assembly defined in claim 1, wherein said vapor chamber inlet includes a float operated shutoff valve operative upon fuel level in the tank rising to a predetermined level to close said inlet.

3. The assembly defined in claim 2, wherein said shutoff valve includes an inertial member.

4. The assembly defined in claim 1, wherein said dip tube passes through said recirculation chamber.

5. The assembly defined in claim 1, wherein said housing includes an annular flange for mounting said assembly over an access opening on the tank.

6. The assembly defined in claim 1, wherein said dip tube includes a float operated shutoff valve operable in response to fuel in the tank rising to a predetermined level to close said dip tube.

7. The assembly defined in claim 6, wherein said shutoff valve includes an inertial member.

8. A method of controlling vapor emission from an engine fuel tank comprising:
    forming a vapor chamber in a valve housing;
    partitioning said vapor chamber to form a vent chamber and a recirculation chamber and connecting an inlet in said vent chamber to said tank and an outlet in said vent chamber to a vapor storage device;
    disposing a diaphragm in the recirculation chamber;
    disposing a moveable valve member in said vent chamber and operatively connecting said valve member to said diaphragm and moving said valve member in response to a differential of pressure forces across the diaphragm;
    forming a bleed path from said vent chamber to said recirculation chamber and connecting an outlet of the recirculation chamber to a filler tube in the tank; and,
    disposing a dip tube on said housing, wherein the diaphragm partitions the recirculation chamber and defines a passage across the diaphragm to form a flow restriction between the dip tube and the outlet in the recirculation chamber; and
    positioning an end of the dip tube to a predetermined fill level in the tank and communicating said tube with said vent chamber.

9. The method defined in claim 8, wherein the step of disposing the diaphragm includes forming the diaphragm of elastomeric material.

10. The method defined in claim 8, wherein the step of disposing a dip tube includes disposing a float operated shutoff valve.

11. The method defined in claim 10, wherein said step of disposing a shutoff valve includes disposing an inertial member in said valve.

12. The method defined in claim 8, wherein the step of forming a vent chamber includes disposing a float operated shutoff valve in the vent chamber inlet from the tank.

13. The method defined in claim 12, wherein the step of disposing a shutoff valve includes disposing an inertial member.

* * * * *